United States Patent
Leeds et al.

(10) Patent No.: US 11,724,221 B2
(45) Date of Patent: Aug. 15, 2023

(54) FILTER KEY FOR FOUNTAIN ACCESS DOOR

(71) Applicant: GLOBAL INDUSTRIAL DISTRIBUTION INC., Port Washington, NY (US)

(72) Inventors: Richard B. Leeds, Port Washington, NY (US); Bruce Zutler, Port Washington, NY (US); Phillip Lee, Port Washington, NY (US)

(73) Assignee: GLOBAL INDUSTRIAL DISTRIBUTION INC., Port Washington, NY (US)

( * ) Notice: Subject to any disclaimer, the term of this patent is extended or adjusted under 35 U.S.C. 154(b) by 315 days.

(21) Appl. No.: 17/205,945

(22) Filed: Mar. 18, 2021

(65) Prior Publication Data

US 2022/0297035 A1    Sep. 22, 2022

(51) Int. Cl.
*B01D 35/30* (2006.01)
*B01D 35/147* (2006.01)
*B67D 1/00* (2006.01)
*B67D 7/76* (2010.01)

(52) U.S. Cl.
CPC ........... *B01D 35/30* (2013.01); *B01D 35/147* (2013.01); *B67D 1/0014* (2013.01); *B67D 7/766* (2013.01); *B01D 2201/4053* (2013.01); *B67D 2210/0001* (2013.01)

(58) Field of Classification Search
CPC .. E03B 7/07; E03B 9/20; B01D 29/13; B01D 27/08; B01D 2201/04; B01D 35/30; B01D 35/147; B01D 2201/4053; C02F 2201/006; B65D 55/14; B65D 51/28; B67D 1/0014; B67D 7/766; B67D 2210/0001
USPC ............................................. 222/130, 153.03
See application file for complete search history.

(56) References Cited

U.S. PATENT DOCUMENTS

| | | | | |
|---|---|---|---|---|
| 8,573,447 B2* | 11/2013 | Muderlak | ............ | B65D 83/262 |
| | | | | 222/325 |
| 2012/0080445 A1* | 4/2012 | Moezidis | .............. | F25D 31/007 |
| | | | | 222/399 |
| 2013/0292417 A1* | 11/2013 | Pelkey | ................ | E05B 13/002 |
| | | | | 74/491 |
| 2022/0034073 A1* | 2/2022 | Boeltl | ................ | B01D 35/306 |

* cited by examiner

*Primary Examiner* — Vishal Pancholi
*Assistant Examiner* — Robert K Nichols, II
(74) *Attorney, Agent, or Firm* — Troutman Pepper Hamilton Sanders LLP

(57) ABSTRACT

A liquid dispenser station includes a liquid dispenser configured to dispense liquid that passes through a filter. The filter is disposed within the liquid dispenser station. The liquid dispenser has an access door to provide access to the filter. The filter includes a key to open the access door.

16 Claims, 6 Drawing Sheets

FILTER KEY FOR FOUNTAIN ACCESS DOOR

FIELD OF INVENTION

The present invention generally relates to a replaceable filter for a liquid dispenser station, and more particularly, to a key configuration on the replaceable filter to unlock an access door of the liquid dispenser station.

BACKGROUND

Existing liquid dispensers have many known issues that need improvements. For example, when replacing a filter in an existing liquid dispenser, the entire chassis of the liquid dispenser typically needs to be removed in order to gain access to the filter, which is a labor-intensive and time-consuming process. As such, there is a need for a quick and simplified mechanism to replace the filter. Various embodiments of the disclosed technology address these needs.

SUMMARY

It is an object of the present invention to provide systems, devices, and methods to meet the above-stated needs. The disclosed technology relates to an example liquid dispenser station. The example liquid dispenser station may include a liquid dispenser configured to dispense liquid that passes through a filter. The filter may be disposed within the liquid dispenser station. An access door may provide access to the filter. The filter may include a key to open the access door.

In one embodiment, the filter may be disposed in an interior volume of the liquid dispenser station. The access door may be configured to gain access to the interior volume.

In one embodiment, the access door may define a keyhole for receiving the key in order to open the access door.

In one embodiment, the key may be in the form of a protrusion extended from a bottom end of the filter.

In one embodiment, the protrusion may have a cylindrical configuration.

In one embodiment, the protrusion may have a through hole therein.

In one embodiment, the through hole may have a square profile in its cross section.

In one embodiment, the key may be disposed at a center of the bottom end of the filter.

In one embodiment, the key may be disposed approximately near a periphery of the bottom end of the filter.

In one embodiment, the filter may be removable. A non-filtering bypass cap may replace the filter to allow the liquid to be dispensed to pass therethrough.

In one embodiment, the non-filtering bypass cap may have a key to open the access door.

In one embodiment, the access door may be openable by a separate key located outside of the access door.

In one embodiment, the separate key may be part of a second filter used to replace the filter disposed within the liquid dispenser station.

In one embodiment, the separate key may be a standalone key.

In one embodiment, the filter has a top end configured to secure the filter within the liquid dispenser station.

Another aspect of the present invention includes a liquid dispenser station. The liquid dispenser may be configured to dispense liquid. The liquid dispenser may include a replaceable component. The liquid dispenser station may include an access door to gain access to the filter. The replaceable component may be accessible via the access door, so that the replaceable component upon expiration is replaced with a new component. The new component may include a key to open the access door.

Various aspects of the described example embodiments may be combined with aspects of certain other example embodiments to realize yet further embodiments. It is to be understood that one or more features of any one example may be combined with one or more features of the other example. In addition, any single feature or combination of features in any example or examples may constitute patentable subject matter. Other features of the technology will be apparent from consideration of the information contained in the following detailed description.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation. Like reference numerals in the various figures are utilized to designate like components.

DETAILED DESCRIPTION

Figure 1:
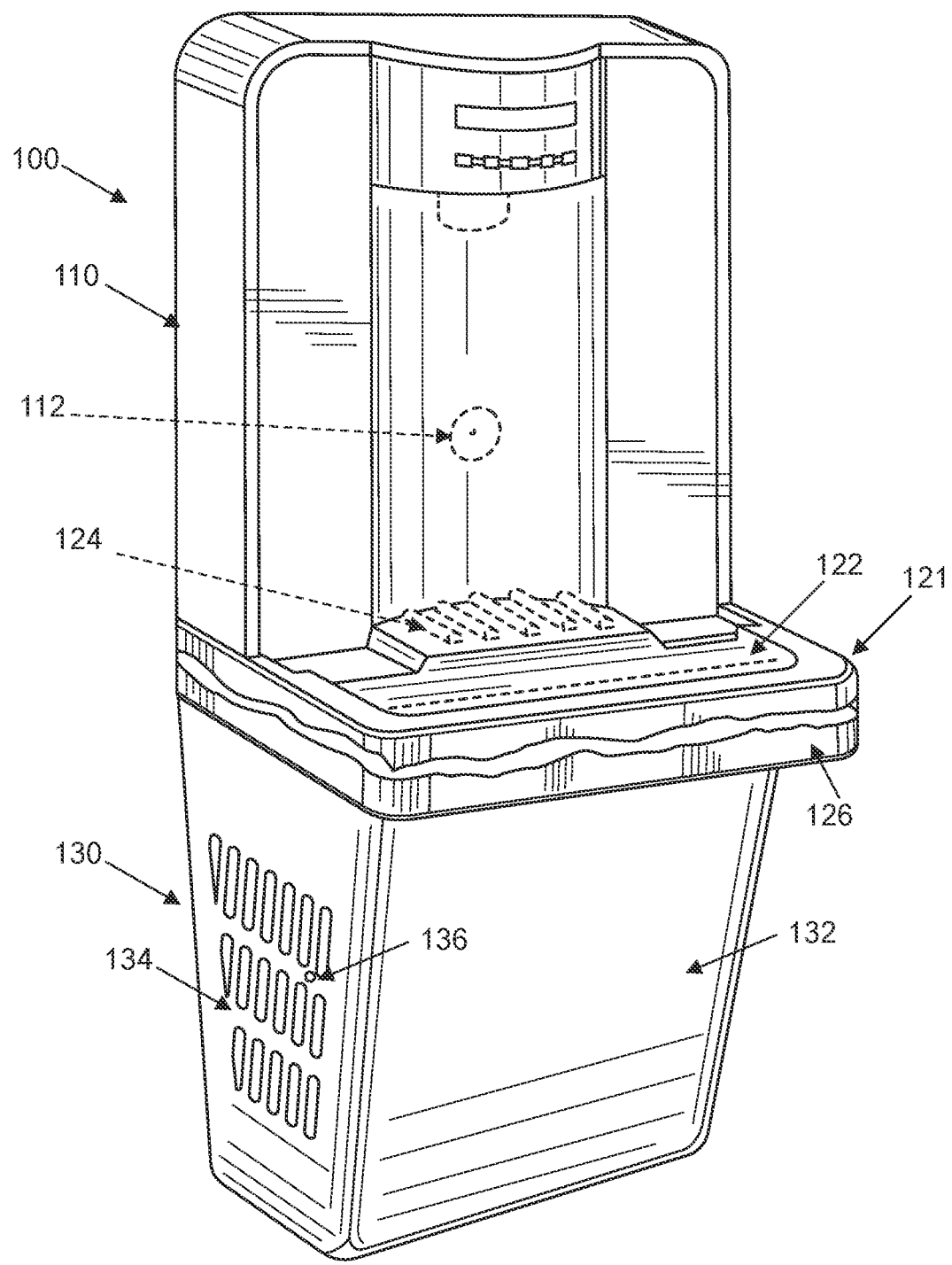
FIG. 1 is an illustration of an example bottle filling station according to one aspect of the present invention.

An example bottle filling station or liquid dispenser station 100 is illustrated in FIG. 1. The bottle filling station 100 may include a liquid dispenser or bottle filler 110 configured to dispense liquid.

A pan 121 may be configured to collect at least a portion of the dispensed liquid. The pan 121 may be positioned below the liquid dispenser 110. The pan 121 may include a plurality of protrusions 124 to support the liquid container when at rest, and to direct spilled water into the basin 122. The pan 121 may include a stainless-steel basin 122. The station 100 may or may not have a bubbler (not illustrated).

All plumbing and chilling apparatus may be provided below the basin 122. A sensor 112 may detect a presence of a liquid container, such as a bottle.

A cooling system 130 may be located below the liquid dispenser 110. The cooling system 330 may include a stainless steel, lower container 132. The lower container 132 may enclose an interior volume, and an access door 134 can be disposed in the lower container 132. The lower container 132 may comprise three faces. The access door 134 may be disposed in at least one of the three faces.

The access door 134 may have an open position that allows access to the interior volume. The access door 134 may allow access to the interior of the bottle filling station 100 to replace a filter, change to programming through a controller and can provide internal access to electrical and plumbing elements, such as access to an AC/DC power supply powering the bottle filling station 100.

The access door 134 may include a keyhole 136 for receiving a key in order to open the access door. The keyhole may be located outside of the access door 134. The key may be a standalone key. Alternatively, the key may be part of a new filter which is used to replace the filter disposed within the liquid dispenser station 100. Each filter can have the same key configuration.

Figure 2:
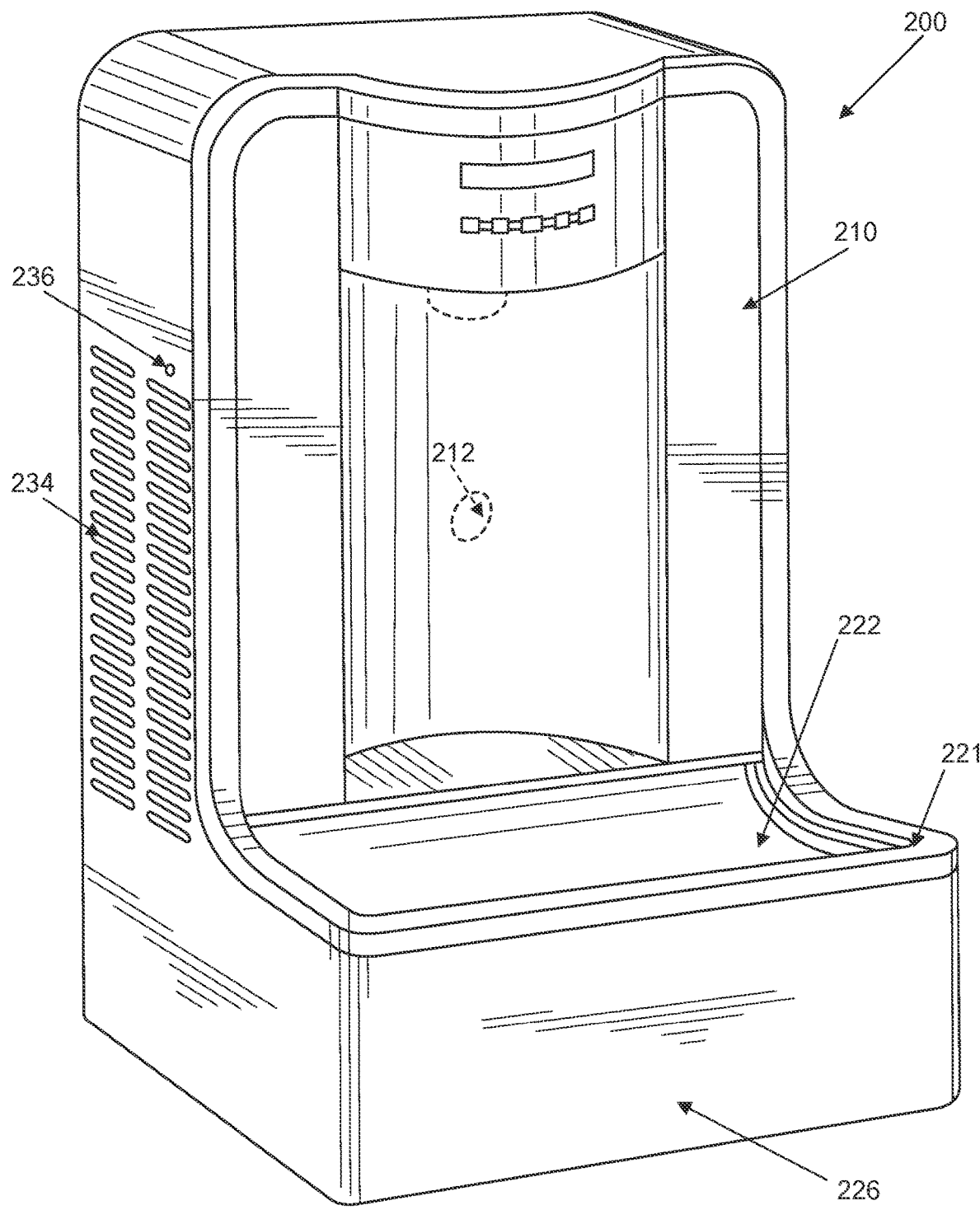
FIG. 2 is an illustration of an example bottle filling station according to another aspect of the present invention.

FIG. 2 illustrates another embodiment of a bottle filling station or liquid dispenser station 200. The bottle filling station 200 may include a liquid dispenser or bottle filler 210 configured to dispense liquid. The bottle filling station 200 may or may not have a drinking fountain.

The bottle filler 210 may include a cooling system therein, and an access door 234 to access interior volume of the bottle filter 210. The access door 234 may include a keyhole 236 for receiving a key to open the access door 234. The interior volume of the bottle filler 210 may include one or more of the following: an AC/DC power supply powering the bottle filling station 200, a filter where the liquid to be dispensed passes therethrough, a controller and electrical and plumbing elements.

A pan 221 may be configured to collect at least a portion of the dispensed liquid. The pan 221 may define an outer surface 226 exhibiting a rectangular profile. The pan 521 may define a flat sloping pan shape. The pan 221 may not include a bubbler. The pan 521 may include a stainless-steel basin 222. A sensor 212 may detect a presence of the liquid container, such as a bottle.

Figure 3:
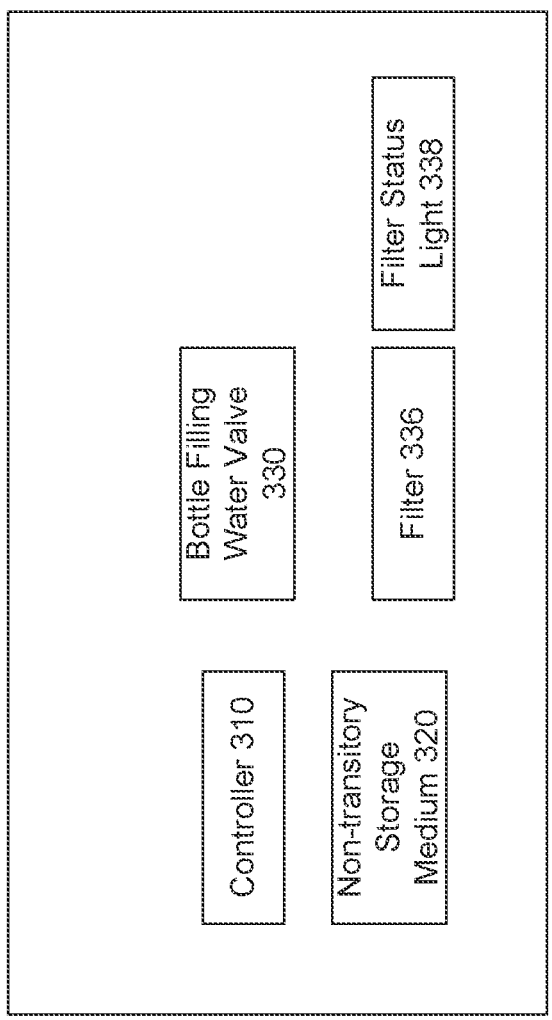
FIG. 3 is a block diagram of the example bottle filling station according to aspects of the present invention.

FIG. 3 illustrates example components that may be contained within one or more embodiments of the bottle filing station of the present invention. A controller 310 may control the bottle filler to dispense liquid when the liquid container is approximately near the sensor. The controller 310 may open and close a bottle filling water valve 330 based on the detection by the sensor.

A non-transitory storage medium 320 may be configured to store a sensitivity level. The sensitivity level may be used by the sensor for detecting the presence of the liquid container.

A filter 336 may allow the liquid to be dispensed to pass therethrough. The filter 336 may be removable. The filter 336 may be disposable and replaceable. The water supply to both the cooling system and the liquid dispenser may pass through the filter 336.

The filter 336 may be configured to remove or reduce at least one of the following: chlorine, odors, lead and cysts. The filter 336 may be NSF/ANSI 42 and 53 complaint. The filter 336 may have a unique threading engagement customized for individual manufactures. The filter 336 may be configured to perform a maximum of 3000-gallon filter cycles.

A filter status light 338 may indicate a status of the filter 336. The filter status light 338 may begin to flash once the status of the filter 336 drops below a preset threshold. The filter status light 338 may include a plurality of LED lights. Each of the plurality of LED lights may correspond to a preset filter status threshold. As the filter 336 reaches each of the individual preset filter status thresholds, the corresponding LED light can at least one of change color, flash, or shut off. The filter status light 338 may generate a signal when the filter 336 has expired or when there is a need to replace the filter 336.

Figure 4:
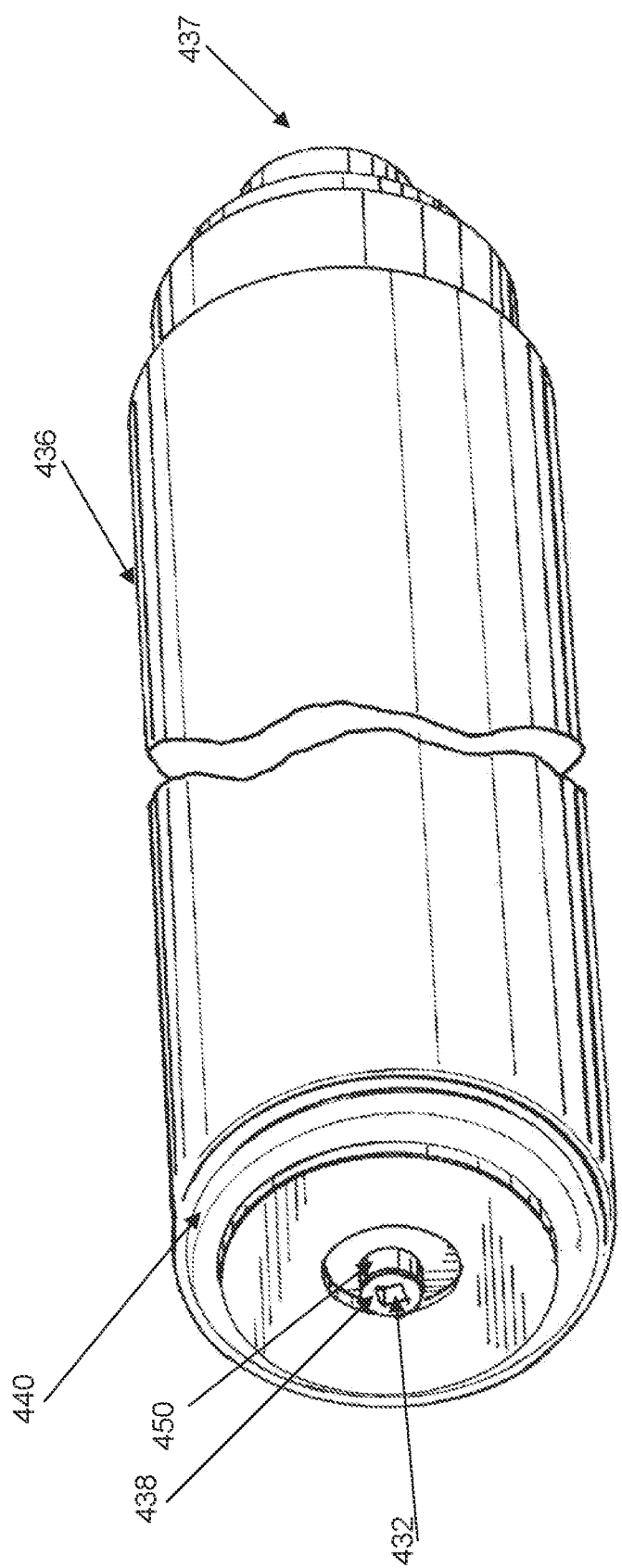
FIG. 4 illustrates a first embodiment of a filter with a key configuration according aspects of the present invention.
Figure 5:
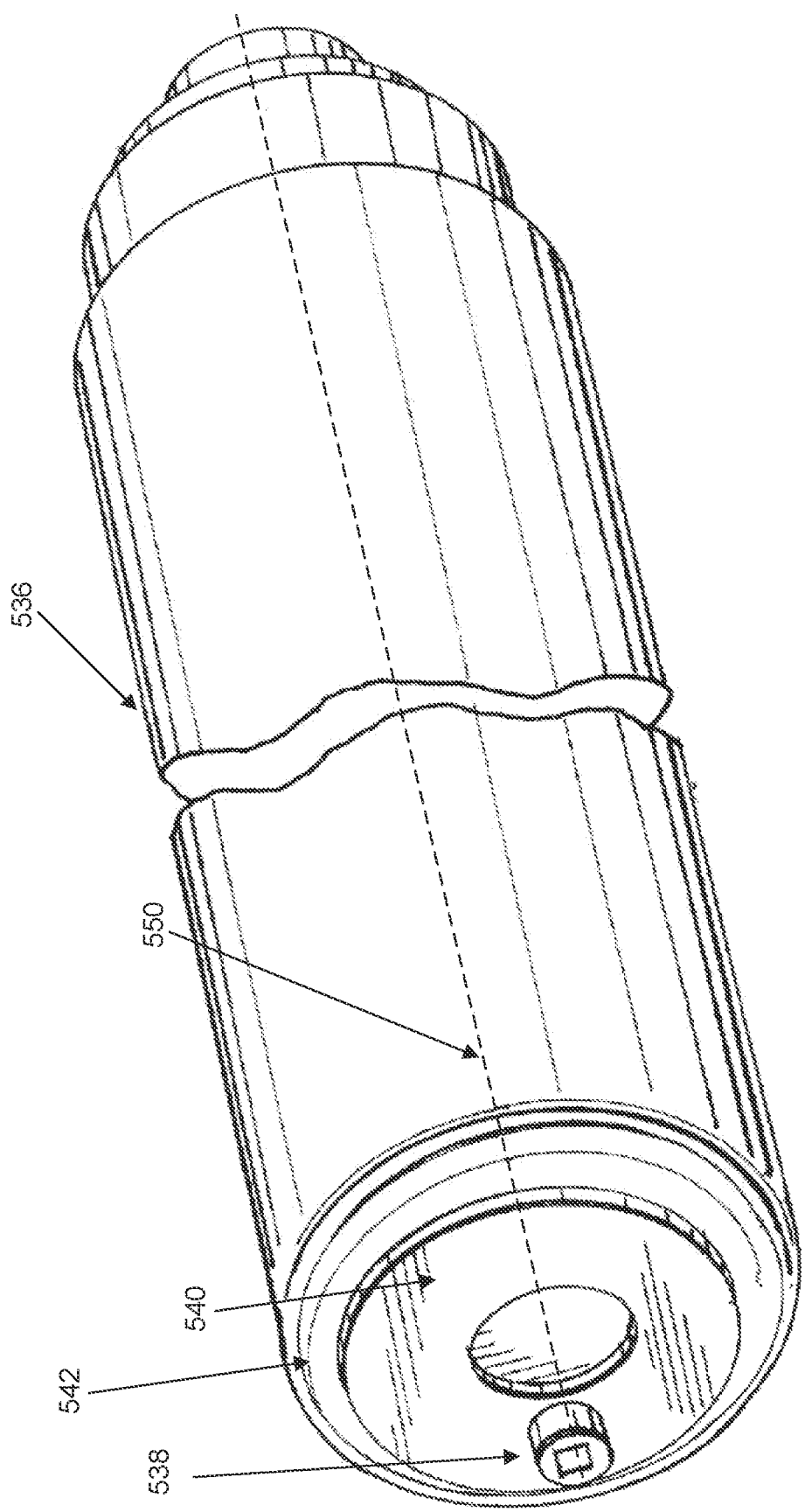
FIG. 5 illustrates a second embodiment of a filter with a key configuration according aspects of the present invention.

FIGS. 4-5 illustrate different embodiments of the filter. Referring to FIG. 4, the filter 436 may include a top end 437 configured to secure the filter within the liquid dispenser station. For example, the top end 437 may have male/female threads to be screwed into a liquid flow circuit of the liquid dispenser station. The filter 436 may be removably attached to the liquid flow circuit via a thread engagement.

The filter 436 may include a key 438 to open the access door. The key 438 may be in the form of a protrusion extended from a bottom end 440 of the filter 436. The protrusion may have a cylindrical configuration. The protrusion may have a through hole 432 therein. The through hole 432 may have a square profile in its cross section. The key 438 may be disposed at a center 450 of the bottom end 440 of the filter 436.

In another embodiment as illustrated in FIG. 5, the key 538 may be disposed approximately near a periphery 542 of the bottom end 540 of the filter 536, or stated differently, off a centerline 550 of the filter 536.

Figure 6:
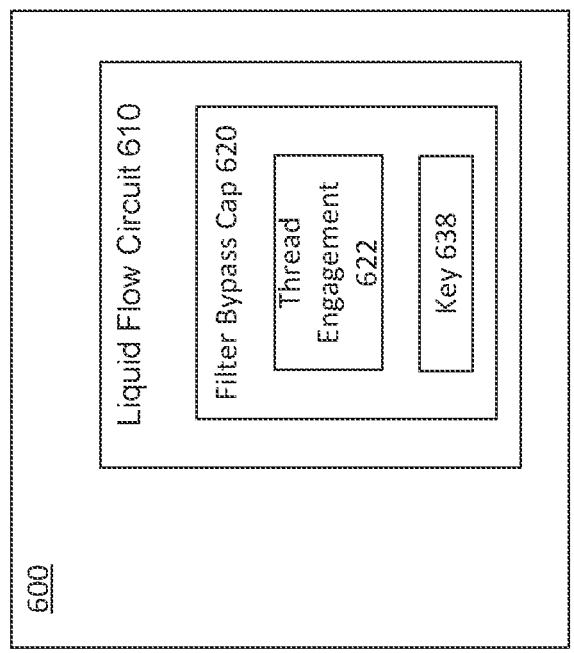
FIG. 6 illustrates a block diagram of a liquid dispenser station according to aspects of the present invention.

FIG. 6 illustrates another embodiment of a liquid dispenser station 600. The liquid dispenser station 600 may include a liquid flow circuit 610. A non-filtering bypass cap 620 may be disposed in the liquid flow circuit 610 at a filter's position when the filter is removed or screwed off from the liquid dispenser station. The non-filtering bypass cap 620 may have a physical dimension identical to that of the filter 336, 436, or 536. The non-filtering bypass cap 620 may have male/female threads to be screwed into the liquid flow circuit 610. The non-filtering bypass cap 620 may be removably attached to the liquid flow circuit 610 via a thread engagement 622. The non-filtering bypass cap 620 may be configured to allow liquid to flow therethrough. The non-filtering bypass cap 620 may replace the filter 336, 436, 536 to allow the liquid to be dispensed to pass therethrough. Alternately, the non-filtering bypass cap 620 can just provide enough support to engage the liquid flow circuit 610 and does not have any capacity to retain or filter liquid. The non-filtering bypass cap 620 may also have a key 638 to open the access door. The key 638 may exhibit a profile similar to or identical to the key 438 of FIG. 4 or the key 538 of FIG. 5.

In one embodiment, a key for the access door may be in any shape, configuration, or placement. The key does not necessarily have to be mounted on the filter. Rather, the key may be part of any component within the liquid dispenser station. For instance, the key may be part of any replacement component. Whenever a component within the liquid dispenser station that needs to be replaced, its replacement component may include the key to open access door. Once the access door is opened, the expired component may be replaced by the replacement component. In one embodiment, the key to open the access door may be a smart universal system keyed to a product, a replacement or service part ecosystem of the product.

The descriptions contained herein are examples of embodiments of the invention and are not intended in any way to limit the scope of the invention. As described herein, the invention contemplates many variations and modifications of the insertion apparatus. These modifications would be apparent to those having ordinary skill in the art to which this invention relates and are intended to be within the scope of the claims which follow.

What is claimed is:

1. A liquid dispenser station comprising:
   a liquid dispenser configured to dispense liquid that passes through a filter, the filter disposed within the liquid dispenser station;

an access door to gain access to the filter, wherein the filter comprises a key to open the access door.

2. The liquid dispenser station of claim 1, wherein the filter is disposed in an interior volume of the liquid dispenser station, and the access door is configured to gain access to the interior volume.

3. The liquid dispenser station of claim 1, wherein the access door defines a keyhole configured to receive the key in order to open the access door.

4. The liquid dispenser station of claim 1, wherein the key is in the form of a protrusion extended from a bottom end of the filter.

5. The liquid dispenser station of claim 4, wherein the protrusion has a cylindrical configuration.

6. The liquid dispenser station of claim 4, wherein the protrusion has a through hole therein.

7. The liquid dispenser station of claim 6, wherein the through hole has a square profile in its cross section.

8. The liquid dispenser station of claim 4, wherein the key is disposed at a center of the bottom end of the filter.

9. The liquid dispenser station of claim 4, wherein the key is disposed approximately near a periphery of the bottom end of the filter.

10. The liquid dispenser station of claim 1, wherein the filter is removable, and further comprising a non-filtering bypass cap that can replace the filter to allow the liquid to be dispensed to pass therethrough without filtration.

11. The liquid dispenser station of claim 10, wherein the non-filtering bypass cap has a key to open the access door.

12. The liquid dispenser station of claim 1, wherein the access door is openable by a separate key located outside of the access door.

13. The liquid dispenser station of claim 12, wherein the separate key is part of a second filter used to replace the filter disposed within the liquid dispenser station.

14. The liquid dispenser station of claim 12, wherein the separate key is a standalone key.

15. The liquid dispenser of claim 1, wherein the filter has a top end configured to secure the filter within the liquid dispenser station.

16. A liquid dispenser station comprising:

a liquid dispenser configured to dispense liquid, the liquid dispenser including a replaceable component; and an access door to gain access to the replaceable component, wherein the replaceable component is accessible via the access door, so that the replaceable component upon expiration is replaced with a new component, and wherein the new component includes a key to open the access door.

* * * * *